(12) United States Patent
Smith

(10) Patent No.: US 10,793,434 B2
(45) Date of Patent: Oct. 6, 2020

(54) SYSTEM FOR HYDROGEN SULFIDE DESTRUCTION AND SULFUR RECOVERY

(71) Applicant: Strom W. Smith, Ocean Springs, MS (US)

(72) Inventor: Strom W. Smith, Ocean Springs, MS (US)

(*) Notice: Subject to any disclaimer, the term of this patent is extended or adjusted under 35 U.S.C. 154(b) by 0 days.

(21) Appl. No.: 16/749,031

(22) Filed: Jan. 22, 2020

(65) Prior Publication Data

US 2020/0239310 A1    Jul. 30, 2020

Related U.S. Application Data

(60) Provisional application No. 62/797,135, filed on Jan. 25, 2019.

(51) Int. Cl.
*C01B 17/04* (2006.01)
*C01B 17/54* (2006.01)

(52) U.S. Cl.
CPC ........ *C01B 17/0439* (2013.01); *C01B 17/043* (2013.01); *C01B 17/0417* (2013.01); *C01B 17/0447* (2013.01); *C01B 17/54* (2013.01)

(58) Field of Classification Search
CPC . C01B 17/04; C01B 17/0404; C01B 17/0434; C01B 17/046; C01B 17/05; C01B 17/0232; C10L 3/103; B01D 53/8615; B01D 53/523; B01D 53/78; B01D 2257/302; B01D 2257/304; B01J 19/00; B01J 2219/00002
See application file for complete search history.

(56) References Cited

U.S. PATENT DOCUMENTS

| | | | | |
|---|---|---|---|---|
| 2,726,933 A | * | 12/1955 | Hurmence | .......... C01B 17/0426 423/543 |
| 2,758,913 A | * | 8/1956 | Pearce | .......... C01B 17/046 423/576.8 |
| 4,046,867 A | | 9/1977 | Seeling et al. | |

(Continued)

FOREIGN PATENT DOCUMENTS

| | | | | |
|---|---|---|---|---|
| WO | WO 9611164 A1 | * | 4/1996 | ......... B01D 53/8515 |
| WO | WO 2005007570 A2 | * | 1/2005 | ......... C01B 17/0404 |
| WO | WO 2005007570 A3 | * | 6/2005 | ......... C01B 17/0456 |

*Primary Examiner* — Timothy C Vanoy
(74) *Attorney, Agent, or Firm* — Keeling Law, LLC; Kenneth A. Keeling; Mark S. Solomon

(57) ABSTRACT

Embodiments of a hydrogen sulfide destruction and sulfur recovery system of the present invention generally include a tower, sulfur introduction piping, oxygen introduction piping, and hydrogen sulfide introduction piping, wherein said tower contains a lower cooling component positioned in a vapor space of a tower bottom section, a lower vapor space fluidly connected to an upper vapor space, one or more upper and lower catalyst beds, a first condensation cooling component and a collection tray disposed in a first condensation section, a second condensation cooling component disposed in a second condensation section, a fluid pathway, partially defined by a collection tray weir, between the first condensation section and the second condensation section, a fluid pathway between a bottom section of the second condensation section and the tower bottom section, and a second condensation section bottom section gas outlet. Embodiments of a method of using the system are also provided.

20 Claims, 2 Drawing Sheets

(56) References Cited

U.S. PATENT DOCUMENTS

| | | | |
|---|---|---|---|
| 4,556,523 A | | 12/1985 | Lecoffre et al. |
| 5,010,052 A | * | 4/1991 | Quemere ................. B01J 23/10 |
| | | | 502/304 |
| 5,021,232 A | | 6/1991 | Hise et al. |
| 5,080,695 A | | 1/1992 | Kassarjian |
| 5,340,383 A | | 8/1994 | Womack |
| 5,389,351 A | * | 2/1995 | Hasebe .............. B01D 53/1468 |
| | | | 423/220 |
| 5,632,967 A | | 5/1997 | Nasato |
| 5,741,469 A | | 4/1998 | Bhore et al. |
| 6,149,887 A | | 11/2000 | Lagas et al. |
| 6,610,264 B1 | | 8/2003 | Buchanan et al. |
| 6,645,459 B2 | | 11/2003 | Lynn |
| 6,676,918 B2 | | 1/2004 | Wu et al. |
| 7,250,149 B1 | | 7/2007 | Smith |
| 7,501,111 B2 | * | 3/2009 | Keller ................. C01B 17/0439 |
| | | | 165/138 |
| 8,021,539 B2 | | 9/2011 | Hassan et al. |
| 8,371,741 B2 | | 2/2013 | Hassan et al. |
| 9,216,372 B1 | | 12/2015 | Smith |
| 9,346,677 B2 | | 5/2016 | Metheral et al. |
| 9,796,588 B2 | | 10/2017 | Smith |
| 2008/0311030 A1 | * | 12/2008 | Boll .................... C01B 17/0456 |
| | | | 423/576.2 |

* cited by examiner

SYSTEM FOR HYDROGEN SULFIDE DESTRUCTION AND SULFUR RECOVERY

CROSS-REFERENCE TO RELATED APPLICATIONS

This application claims the benefit of U.S. Provisional Application No. 62/797,135, filed on Jan. 25, 2019, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention generally relates to sulfur processing. More particularly, embodiments of the present invention are directed to an apparatus and a method for chemically eliminating waste hydrogen sulfide.

Background of the Invention

Sulfur is used for manufacturing sulfuric acid, medicine, cosmetics, fertilizers, and rubber products. The majority of sulfur produced worldwide is byproduct sulfur from crude oil refineries and other hydrocarbon processing plants. Typically present in the sulfur produced in a sulfur manufacturing process is hydrogen sulfide. As hydrogen sulfide is an undesired impurity, process streams must be further processed to remove it therefrom. In one aspect, hydrogen sulfide is removed from process streams by sparging the process streams with gas(es). Such technology is well known in the art, such as described in U.S. Pat. No. 9,346,677 to Metheral et al., U.S. Pat. Nos. 8,371,741 and 8,021,539 to Hassan et al., U.S. Pat. No. 6,676,918 to Wu et al., U.S. Pat. No. 6,149,887 to Lagas, et al, U.S. Pat. No. 5,632,967 to Nasato, U.S. Pat. No. 5,340,383 to Womack, U.S. Pat. No. 5,080,695 to Kassarjian, and U.S. Pat. No. 4,556,523 to Lecoffre et al., which patents are incorporated herein by reference in their entirety as if reproduced in full below. By such processing, the hydrogen sulfide is concentrated into one or more waste streams. One challenge present in the field is how to deal with these hydrogen sulfide-rich waste streams.

DESCRIPTION OF THE RELATED ART

It is well known that hydrogen sulfide reacts with sulfur dioxide. In such a reaction, the reactants are converted to sulfur and water; the chemical expression for which is $2H_2S+SO_2 \rightarrow 1.5S_2+2H_2O$. This reaction is well known within the sulfur industry, such as disclosed in U.S. Pat. No. 5,021,232 to Hise et al., U.S. Pat. No. 5,741,469 to Bhore et al., U.S. Pat. No. 6,610,264 to Buchanan et al., U.S. Pat. No. 6,645,459 to Lynn, and U.S. Pat. No. 7,250,149 to Smith, which patents are incorporated herein by reference in their entirety as if reproduced in full below. In many such known applications of this chemistry, the purpose of combining the reactants is to remove sulfur dioxide from process streams by adding hydrogen sulfide thereto. Also well known within the sulfur industry is that sulfur dioxide can be produced by combining sulfur with oxygen, the chemical expression for which is $S_2+2O_2 \rightarrow 2SO_2$, as described in U.S. Pat. No. 2,726,933 to Merriam et al. and U.S. Pat. No. 4,046,867 to Seeling et al., which patents are incorporated herein by reference in their entirety as if reproduced in full below. In the present invention, both chemical reactions are employed to both destroy hydrogen sulfide in, and recover sulfur from, process streams.

BRIEF SUMMARY OF THE INVENTION

Embodiments of a hydrogen sulfide removal and sulfur recovery system of the present invention generally include a tower containing one or more catalytic beds, wherein liquid sulfur and oxygen are combined to produce sulfur dioxide therein, and wherein a fluid hydrogen sulfide containing stream is introduced thereto, and the sulfur dioxide and hydrogen sulfide are catalytically reacted to produce sulfur and water. Embodiments of a method of using embodiments of a hydrogen removal system of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
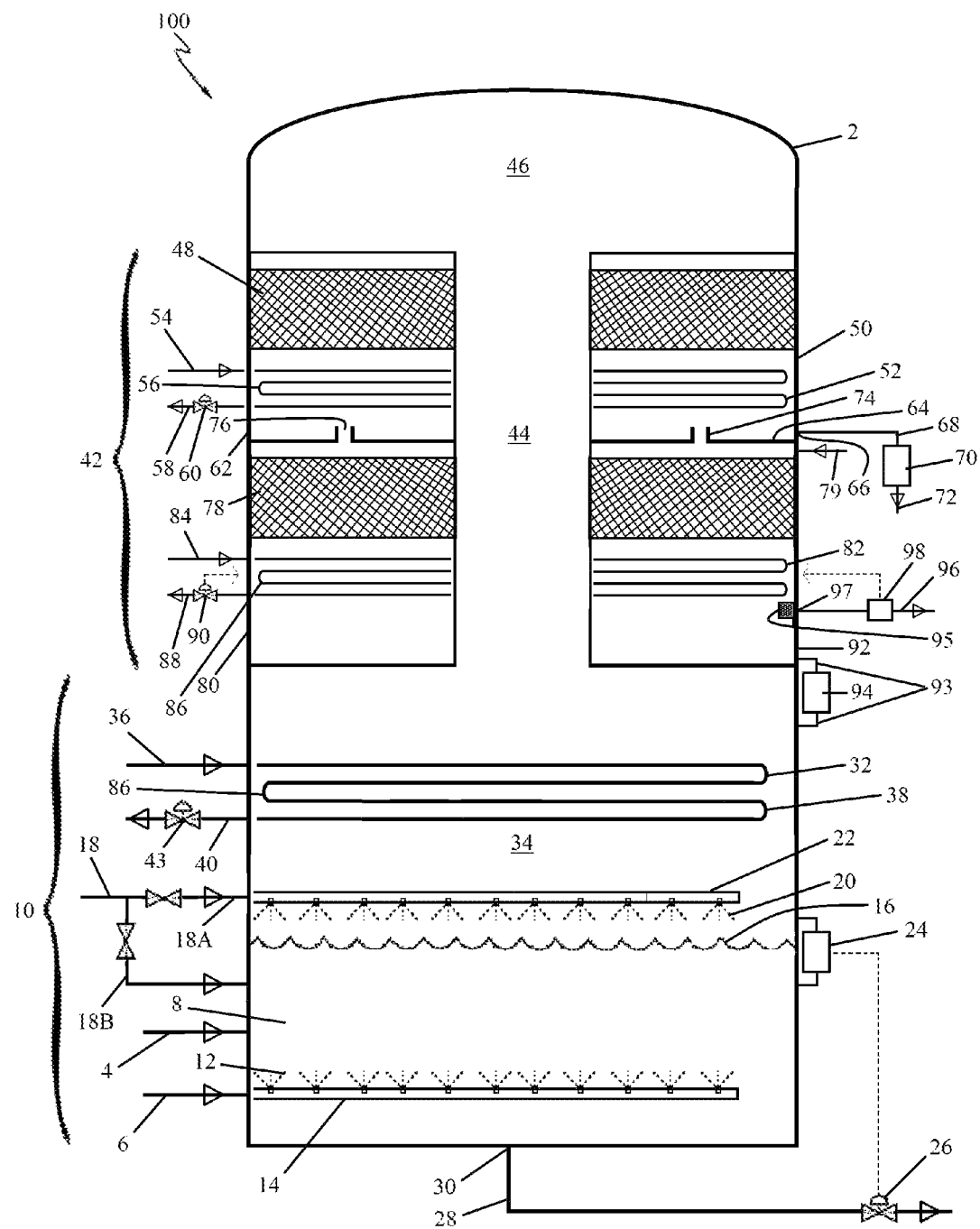
FIG. 1 is cross-sectional side view of an embodiment of a hydrogen sulfide destruction and sulfur recovery system of the present invention.

The exemplary embodiments are best understood by referring to the drawings, like numerals being used for like and corresponding parts of the various drawings. In the following description of embodiments, orientation indicators such as "top," "bottom," "up,' "down," "upper," "lower," "front," "back," etc. are used for illustration purposes only; the invention, however, is not so limited, and other possible orientations are contemplated.

Referring first to FIG. 1, an embodiment of a hydrogen sulfide destruction and sulfur recovery system 100 is depicted. In one embodiment, a system 100 comprises a tower 2, into which is introduced molten sulfur via a sulfur inlet line 4, and an oxygen containing gas stream 12 via a gas inlet line 6. In one embodiment, a volume of liquid sulfur 8 is maintained within a bottom section 10 of tower 2. In one embodiment, the oxygen containing gas 12 is provided via a gas dispersion component 14 positioned beneath a sulfur liquid level 16, although other means and configurations may be employed, as would be understood by one skilled in the art.

In one embodiment, system 100 comprises a bottom hydrogen sulfide inlet line 18 which can provide a hydrogen sulfide containing stream 20 to tower 2. In one embodiment, the hydrogen sulfide containing stream 20 comprises liquid. In one embodiment, the hydrogen sulfide containing material 20 is provided above the sulfur liquid level 16, via an upper section 18A of bottom hydrogen sulfide inlet line 18. In one embodiment, such provision of the hydrogen sulfide containing material 20 above the sulfur liquid level 16 is accomplished utilizing a liquid dispersion component 22, although the invention is not so limited and other arrangements or apparatuses may be employed. In one embodiment, the hydrogen sulfide containing material 20 is provided below the sulfur liquid level 16, via a lower section 18B of bottom hydrogen sulfide inlet line 18. Although not depicted in the embodiment of Figure A, such provision of the hydrogen sulfide containing material 20 below the sulfur liquid level 16 may accomplished utilizing a dispersion component or other device to more evenly distribute the hydrogen sulfide containing material 20 within the liquid sulfur 8. In one aspect, the hydrogen sulfide containing material 20 may be introduced may be provided to tower 2, either alternatingly or concurrently, via both upper section 18A and lower section 18B of bottom hydrogen sulfide inlet line 18.

In one embodiment, system 100 comprises a sump level control device 24, which measures the vertical height of sulfur liquid level 16, and controls that level via communication with a sump outlet valve 26 which controls flow of liquid sulfur 8 that can exit tower 2 through a lower sulfur outlet line 28 via a lower sulfur outlet 30, although the invention is not so limited and other arrangements, configurations, or systems may be employed to maintain a desired level of liquid sulfur 8 in bottom section 10 of tower 2.

In one embodiment, system 100 comprises a lower cooling component 32 disposed at least partially within tower 2, as shown in FIG. 1. In one embodiment, lower cooling component 32 utilizes a coolant (not shown), such as chilled water or other fluid material. As described below, in one aspect lower cooling component 32 provides a means of condensing or otherwise "knocking down" any non-volatile materials present in a lower vapor space 34 above sulfur liquid level 16. In one embodiment, lower cooling component 32 comprises coolant inlet piping 36, internal coolant piping 38, and outlet coolant piping 40, although other arrangements and configurations may be employed. In the embodiment depicted in FIG. 1, flow of coolant (not shown) through lower cooling component 32 is controlled with a control valve 43 positioned along outlet coolant piping 40, although other means and methods of controlling lower cooling component 32 may be employed, as would be understood by one skilled in the art.

In one embodiment, tower 2 of system 100 comprises an intermediate section 42. In one embodiment, intermediate section 42 comprises a void 44 which fluidly connects lower vapor space 34 to an upper vapor space 46, and through which vapors may rise. In one embodiment, void 44 may comprise a substantially tubular centralized configuration, although other orientations and arrangements are contemplated.

In one embodiment, upper vapor space 46 is in fluid communication with one or more upper catalyst beds 48. In one embodiment, an upper catalyst bed 48 comprises a substantially annular component, although other geometries and/or orientations may be employed. In one embodiment, an upper catalyst bed 48 may contain one or more catalytic materials, such as, but not limited to, aluminum(III) oxide and/or titanium(IV) oxide, which catalyze the above-described reaction between sulfur dioxide and hydrogen sulfide, although other catalysts may be employed, as would be understood by one skilled in the art.

In the embodiment depicted in FIG. 1, upper catalyst bed 48 is fluidly connected to a first condensation section 50. In one embodiment, first condensation section 50 comprises a substantially annular area, although other geometries and/or orientations may be employed. In one embodiment, a first condensation cooling component 52 is disposed at least partially within first condensation section 50, as shown in FIG. 1. In one embodiment, first condensation cooling component 52 utilizes a coolant (not shown), such as chilled water or other fluid material. As described below, in one aspect first condensation cooling component 52 provides a means of condensing sulfur present within first condensation section 50. In one embodiment, first condensation cooling component 52 comprises coolant inlet piping 54, internal coolant piping 56, and outlet coolant piping 58, although other arrangements and configurations may be employed. In the embodiment depicted in FIG. 1, flow of coolant (not shown) through first condensation cooling component 52 is controlled with a control valve 60 positioned along outlet coolant piping 58, although other means and methods of controlling first condensation cooling component 52 may be employed, as would be understood by one skilled in the art.

In one embodiment, positioned proximate (or integral with) a bottom 62 of first condensation section 50 is a tray 64. In one aspect, tray 64 serves as a liquid sulfur collection means within first condensation section 50. In one embodiment, liquid sulfur collected on tray 64 (not shown) can flow out of tower 2 via upper sulfur outlet 66. In one embodiment, liquid sulfur exiting tower 2 via upper sulfur outlet 66 flows through an upper sulfur outlet line 68 to an upper sulfur trap 70, and exits therefrom through an upper sulfur trap outlet line 72. In one embodiment, an upper sulfur trap 70 comprises a sulfur trap as disclosed in U.S. Pat. Nos. 9,216,372 and/or 9,796,588 to Smith, both of which patents are incorporated herein by reference in their entirety as if reproduced in full below, although the invention is not so limited and other sulfur trapping devices may be employed.

In one embodiment, tray 64 comprises a weir 74. In one embodiment, weir 74 may be centrally annularly located within tray 64, although other configurations are contemplated. In one embodiment, weir 74 partially defines a fluid pathway 76 which fluidly connects first condensation section 50 with one or more lower catalyst beds 78. In one embodiment, lower catalyst bed(s) 78 may comprise catalytic materials as described above regarding upper catalyst bed(s) 48. In one embodiment, fluids (not shown) flowing through fluid pathway 76 are provided in contact with the lower catalyst bed(s) 78.

In one embodiment, system 100 comprises a top hydrogen sulfide inlet line 79 that is fluidly connected to tower 2, as depicted in FIG. 1. In one embodiment, top hydrogen sulfide inlet line 79 allows for additional hydrogen sulfide (not shown) to be provided to tower 2. In the embodiment, hydrogen sulfide (e.g., as a component of a liquid stream) may be provided above lower catalyst bed(s) 78 via top hydrogen sulfide inlet line 79. As described below, such addition of hydrogen sulfide may be advantageous if residual sulfur dioxide is present in the fluid coming into contact with lower catalyst bed(s) 78.

In the embodiment depicted in FIG. 1, lower catalyst bed 78 is fluidly connected to a second condensation section 80. In one embodiment, second condensation section 80 comprises a substantially annular area, although other geometries and/or orientations may be employed. In one embodiment, a second condensation cooling component 82 is disposed at least partially within second condensation section 80, as shown in FIG. 1. In one embodiment, second condensation cooling component 82 utilizes a coolant (not shown), such as chilled water or other fluid material. As described below, in one aspect second condensation cooling component 82 provides a means of condensing sulfur present within second condensation section 80. In one embodiment, second condensation cooling component 82 comprises coolant inlet piping 84, internal coolant piping 86, and outlet coolant piping 88, although other arrangements and configurations may be employed. In the embodiment depicted in FIG. 1, flow of coolant (not shown) through first condensation cooling component 82 is controlled with a control valve 90 positioned along outlet coolant piping 88, although other means and methods of controlling second condensation cooling component 82 may be employed, as would be understood by one skilled in the art.

In one embodiment, a bottom section 92 of second condensation section 80 is fluidly connected to tower 2 bottom section 10 via a sulfur recovery line 93. In one aspect, sulfur recovery line 93 allows for sulfur (not shown) collecting in bottom section 92 to flow into bottom section 10. In one embodiment, sulfur recovery line 93 may incorporate a lower sulfur trap 94. In one embodiment, lower sulfur trap 94 may be similar to upper sulfur trap 70 described above.

In one embodiment, system 100 comprises one or more demisters 95 in fluid communication with tower 2. In the embodiment depicted in FIG. 1, demister 95 is positioned at least partially within bottom section 92 of second condensation section 80, although other configurations are contemplated. In one embodiment, vapors (as further described below) may flow through demister 95 and a gas outlet 97 out of tower 2 via gas outlet line 96. In one embodiment, the temperature within gas outlet line 96 is monitored and thereby, via a temperature control component 98 which is in electronic communication with second condensation cooling component 82 control valve 90, the temperature of condensation cooling component 82 is appropriately maintained, as would be understood by one skilled in the art. In other embodiments (not shown) temperature control of condensation cooling component 82 may be controlled by other methods and/or devices.

Figure 2:
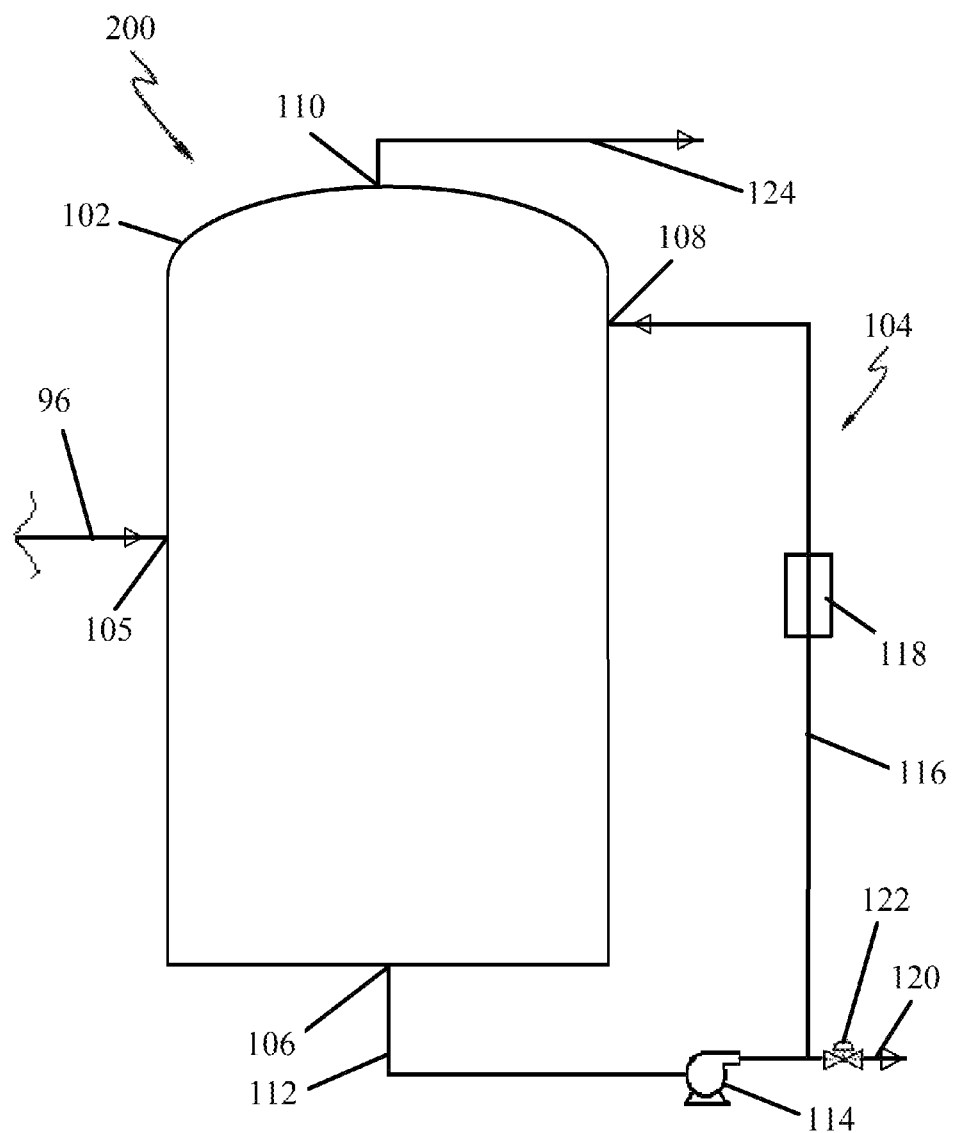
FIG. 2 is a schematic diagram of an embodiment of a quench system of the present invention.

Referring now to FIG. 2, one embodiment of a quench system 200 of the present invention is thereby depicted. In one embodiment, quench system 200 comprises a quench tower 102, a recirculation system 104, a fluid inlet opening 105, a liquid outlet opening 106, a recirculated liquid inlet opening 108, and at least one gas outlet opening 110. In one embodiment, quench tower 102 may comprise a standard liquid/gas separation tower, as would be understood by one skilled in the art. In one embodiment, recirculation system 104 comprises suction piping 112, pump 114, discharge piping 116, and cooler 118. In one embodiment, liquid outlet piping 120, comprising a fluid control valve 122 is fluidly connected to discharge piping 116, although other configurations are contemplated, as would be understood by one skilled in the art. In one embodiment, gas outlet piping 124 is fluidly connected to gas outlet opening 110.

In one embodiment, gas outlet line 96 (from tower 2) may be fluidly connected to quench tower 102, as shown in FIG. 2. Thereby, vapors exiting tower 2 can be introduced into quench tower 102, wherein less volatile components contained within gas outlet line 96 can be removed via liquid outlet piping 120, and more volatile components contained within gas outlet line 96 can be removed via gas outlet piping 124, as described below.

Operation

Generally, a hydrogen sulfide destruction/sulfur recovery operation employing one or more embodiments of the present invention comprises introducing sulfur into bottom section 10 of tower 2 via sulfur inlet line 4 to create a sulfur liquid level 16 there within. In one embodiment, the sulfur introduced into system 100 is obtained from a sulfur operation; i.e., may comprise impurities such as, but not limited to, hydrogen sulfide(s) and/or sulfur dioxide. In one embodiment, sump level control 24 is operated to maintain a desired sulfur liquid level 16. In one embodiment, oxygen or an oxygen containing gas (such as air) 12 is then introduced into tower 2 below the sulfur liquid level 16 via gas inlet line 6, such as through a gas dispersion component 14. Such mixing of sulfur and oxygen results in production of sulfur dioxide, some of which rises into lower vapor space 34.

In one embodiment, hydrogen sulfide is provided to bottom section 10 of tower 2 via hydrogen sulfide inlet line 18. Via such provision, hydrogen sulfide may be introduced into tower 2 through upper section 18A of bottom hydrogen sulfide inlet line above the sulfur liquid level 16, such as via liquid dispersion component 22, through lower section 18B of bottom hydrogen sulfide inlet line below the sulfur liquid level 16, or through both hydrogen sulfide inlet lines 18A and 18B. At least some of the hydrogen sulfide provided within bottom section 10 of tower 2 rises and/or is introduced into lower vapor space 34.

In one aspect, vapors (sulfur dioxide and hydrogen sulfide) rise within tower 2 void 44. In one embodiment, lower cooling component 32 is operated to condense any less volatile components such that the composition of the vapors entering void 44 is maximized for sulfur dioxide and hydrogen sulfide content.

In one aspect, vapors rising through void 44 enter upper vapor space 46. In one embodiment, vapors within vapor space 46 are forced into upper catalyst bed(s) 48. Therein, at least a portion of the sulfur dioxide and hydrogen sulfide react to form sulfur and water. In one embodiment, the components downwardly exiting upper catalyst bed(s) 48 come into contact with first condensation cooling component 52. Typically, all (or almost all) of the sulfur present beneath first condensation cooling component 52 settles in tray 64. In one embodiment, at least some of the sulfur that has settled into tray 64 is removed from tower 2 via upper sulfur outlet line 68. In one embodiment, sulfur flowing through upper sulfur outlet line 68 is provided to an upper sulfur trap 70 and then flows onward via upper sulfur trap outlet line 72 to a desired location. In one embodiment (not shown) this sulfur may be provided, directly or indirectly, back into bottom section 10, via sulfur inlet line 4 or otherwise.

In one embodiment, a portion of the liquid settled in tray 64 overflows weir 74, whereby such liquid flows, via fluid pathway 76, into contact with lower catalyst bed(s) 78. Therein, at least a portion of the sulfur dioxide and hydrogen sulfide react to form sulfur and water. In one embodiment, the components downwardly exiting lower catalyst bed(s) 78 come into contact with second condensation cooling component 82. All of the sulfur present beneath second condensation cooling component 82 settles in bottom section 92 of second condensation section 80.

In one embodiment, vapors, such as, but not limited to, water, carbon dioxide, and residual hydrogen sulfide, exit tower 2 via gas outlet line 96. In one embodiment, such vapors pass through demister 95 before entering gas outlet line 96, thereby "knocking down" any entrained non-volatile components, such as sulfur. In one embodiment, sulfur settled into bottom section 92 of second condensation section 80 flows through sulfur recovery line 93 into bottom section 10 of tower 2. In one embodiment, such sulfur flow comprises employment of lower sulfur trap 94. In one embodiment, temperature control component 98 is operated to control second condensation cooling component 82 to best ensure that the volatile components within second condensation section 80 exit tower 2 via gas outlet line 96.

In one aspect, it is desired that all (or substantially all) of the sulfur dioxide be reacted within tower 2; i.e., that a minimal amount of sulfur dioxide exit tower 2 via gas outlet line 96. In one embodiment, to so insure, additional quantities of hydrogen sulfide may be introduced above lower catalyst bed(s) 78, via top hydrogen sulfide inlet line 79, into second condensation section 80. Thereby, residual amounts of sulfur dioxide may be reacted with hydrogen sulfide within lower catalyst bed(s) 78.

In one embodiment, the vapor stream exiting tower 2 via gas outlet line 96 is introduced to quench system 200 via fluid inlet opening 105. Quench tower 102 is operated to separate the more volatile components there entering (such as hydrogen sulfide and carbon dioxide) from the less volatile components there entering (such as water), as would be understood by one skilled in the art. In one embodiment, such operation comprises operating tower 102 such that gases exit therefrom through outlet piping 124 via gas outlet opening 110, and liquids exit therefrom through liquid outlet piping 120 via liquid outlet opening 106. In one embodiment, recirculation system 104 is operated, utilizing cooler 118, to control the temperature profile within quench tower 102 to ensure maximum desired liquid/gas separation, as would be understood by one skilled in the art.

Method

An exemplary method of a hydrogen sulfide removal/sulfur recovery process utilizing an embodiment of a system 100 of the present invention comprises:

A Sulfur Provision Step, comprising introducing liquid (molten) sulfur into a bottom section of a tower, such as a bottom section 10 of a tower 2;

An Oxygen Provision Step, comprising introducing an oxygen containing gas into the bottom section of the tower beneath a level of sulfur maintained therein;

A Hydrogen Sulfide Provision Step, comprising introducing a hydrogen sulfide containing fluid into the bottom section of the tower above and/or beneath the level of sulfur maintained therein; and A Tower Operation Step, comprising operating the tower to provide for reaction of the sulfur and oxygen to produce sulfur dioxide, to provide for catalyzed reaction of the sulfur dioxide and hydrogen sulfide to produce sulfur and water, and to provide for removal of the water and residual hydrogen sulfide from the tower.

In one embodiment, an exemplary method of a hydrogen sulfide removal/sulfur recovery process utilizing an embodiment of a system 100 of the present invention further comprises:

Utilizing a quench system, such as a quench system 200, wherein gas exiting the tower is flowed into a quench tower, such as quench tower 102, wherein more volatile components of said gas are separated from less volatile components of said gas.

The foregoing methods are merely exemplary, and additional embodiments of a method of utilizing a degassing tower of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

I claim:

1. A hydrogen sulfide destruction and sulfur recovery system comprising:
    a tower;
    sulfur introduction piping;
    oxygen introduction piping; and
    hydrogen sulfide introduction piping;
    wherein said tower comprises:
        a lower cooling component within a lower vapor space of a bottom section of said tower;
        an upper vapor space;
        a void fluidly connecting said lower vapor space and said upper vapor space;
        one or more upper catalyst beds fluidly connected to said upper vapor space;
        a first condensation section comprising a first condensation cooling component disposed beneath said upper catalyst beds and fluidly connected thereto;
        a tray comprising a weir disposed beneath said first condensation cooling component;
        a fluid outlet that allows for fluid flow from said tray out of said tower;
        one or more lower catalyst beds fluidly connected to said first condensation section via a fluid pathway;
        a second condensation section comprising a second condensation cooling component disposed beneath said lower catalyst beds and fluidly connected thereto;
        a fluid outlet that allows for fluid flow from a bottom section of said second condensation section to said bottom section of said tower; and
        a gas outlet that allows gas flow from said bottom section of said second condensation section out of said tower.

2. The hydrogen sulfide destruction and sulfur recovery system of claim 1, wherein said oxygen introduction piping comprises a gas dispersion component.

3. The hydrogen sulfide destruction and sulfur recovery system of claim 1, wherein said hydrogen sulfide introduction piping comprises a gas dispersion component.

4. The hydrogen sulfide destruction and sulfur recovery system of claim 1, wherein at least a portion of said hydrogen sulfide introduction piping is disposed beneath a liquid sulfur level in said bottom section of said tower.

5. The hydrogen sulfide destruction and sulfur recovery system of claim 1, wherein a fluid pathway through which fluid can flow from said bottom section of said second condensation section to said bottom section of said tower comprises a sulfur trap.

6. The hydrogen sulfide destruction and sulfur recovery system of claim 1, wherein a fluid pathway through which fluid can flow from said tray out of said tower comprises a sulfur trap.

7. The hydrogen sulfide destruction and sulfur recovery system of claim 1, comprising a demister through which gas flows to said gas outlet.

8. A hydrogen sulfide destruction and sulfur recovery system comprising:
    a tower;
    sulfur introduction piping;
    oxygen introduction piping;
    hydrogen sulfide introduction piping; and a quench system;

wherein said tower comprises:

a lower cooling component within a lower vapor space of a bottom section of said tower;

an upper vapor space;

a void fluidly connecting said lower vapor space and said upper vapor space;

one or more upper catalyst beds fluidly connected to said upper vapor space;

a first condensation section comprising a first condensation cooling component disposed beneath said upper catalyst beds and fluidly connected thereto;

a tray comprising a weir disposed beneath said first condensation cooling component;

a fluid outlet that allows for fluid flow from said tray out of said tower;

one or more lower catalyst beds fluidly connected to said first condensation section via a fluid pathway;

a second condensation section comprising a second condensation cooling component disposed beneath said lower catalyst beds and fluidly connected thereto;

a fluid outlet that allows for fluid flow from a bottom section of said second condensation section to said bottom section of said tower; and a gas outlet that allows gas flow from said bottom section of said second condensation section out of said tower; and wherein said quench system comprises:

a quench tower comprising:

a fluid inlet;

a fluid outlet; and a gas outlet.

9. The hydrogen sulfide destruction and sulfur recovery system of claim 8, wherein said oxygen introduction piping comprises a gas dispersion component.

10. The hydrogen sulfide destruction and sulfur recovery system of claim 8, wherein said hydrogen sulfide introduction piping comprises a gas dispersion component.

11. The hydrogen sulfide destruction and sulfur recovery system of claim 8, wherein at least a portion of said hydrogen sulfide introduction piping is disposed beneath a liquid sulfur level in said bottom section of said tower.

12. The hydrogen sulfide destruction and sulfur recovery system of claim 8, wherein a fluid pathway through which fluid can flow from said bottom section of said second condensation section to said bottom section of said tower comprises a sulfur trap.

13. The hydrogen sulfide destruction and sulfur recovery system of claim 8, wherein a fluid pathway through which fluid can flow from said tray out of said tower comprises a sulfur trap.

14. The hydrogen sulfide destruction and sulfur recovery system of claim 8, comprising a demister through which gas flows to said gas outlet.

15. A method of destroying hydrogen sulfide and recovering sulfur, comprising:

providing the hydrogen sulfide destruction and sulfur recovery system of claim 1;

introducing liquid sulfur into said tower;

introducing an oxygen containing gas into said tower;

introducing a hydrogen sulfide containing fluid into said tower; and operating said tower to chemically react at least a portion of said hydrogen sulfide with sulfur dioxide produced in said tower and recovering at least a portion of the sulfur produced from said reaction between hydrogen sulfide and sulfur dioxide.

16. The method of destroying hydrogen sulfide and recovering sulfur of claim 15, wherein said oxygen introduction piping comprises a gas dispersion component.

17. The method of destroying hydrogen sulfide and recovering sulfur of claim 15, wherein said hydrogen sulfide introduction piping comprises a gas dispersion component.

18. The method of destroying hydrogen sulfide and recovering sulfur of claim 15, wherein at least a portion of said hydrogen sulfide introduction piping is disposed beneath a liquid sulfur level in said bottom section of said tower.

19. The method of destroying hydrogen sulfide and recovering sulfur of claim 15, wherein said hydrogen sulfide destruction and sulfur recovery system comprises one or more sulfur traps.

20. The method of destroying hydrogen sulfide and recovering sulfur of claim 15, comprising:

introducing at least a portion of vapors exiting said tower into a quench tower; and operating said quench tower to separate more volatile components of said vapors from less volatile components of said vapors.

* * * * *